United States Patent [19]

Dabbs

[11] Patent Number: 5,161,053
[45] Date of Patent: Nov. 3, 1992

[54] CONFOCAL MICROSCOPE

[75] Inventor: Timothy P. Dabbs, West Ryde, Australia

[73] Assignee: Commonwealth Scientific & Industrial Research, Campbell, Australia

[21] Appl. No.: 613,865

[22] PCT Filed: Aug. 1, 1989

[86] PCT No.: PCT/AU89/00323
  § 371 Date: Jan. 29, 1991
  § 102(e) Date: Jan. 29, 1991

[87] PCT Pub. No.: WO90/01716
  PCT Pub. Date: Feb. 22, 1990

[30] Foreign Application Priority Data

Aug. 1, 1988 [AU] Australia ............... PI9587

[51] Int. Cl.⁵ .................................... G02B 21/00
[52] U.S. Cl. ........................... 359/384; 385/147
[58] Field of Search ............ 350/507, 522, 320; 359/362, 384, 372, 381; 385/147

[56] References Cited

U.S. PATENT DOCUMENTS

| Re. 32,660 | 5/1988 | Lindow | 250/201 |
|---|---|---|---|
| 4,500,204 | 2/1985 | Ogura | 356/318 |
| 4,621,531 | 11/1986 | Nakamura et al. | 73/606 |
| 5,004,321 | 4/1991 | Feldman et al. | 350/320 |
| 5,020,891 | 6/1991 | Lichtman et al. | 350/527 |
| 5,022,743 | 6/1991 | Kino et al. | 350/507 |
| 5,032,720 | 7/1991 | White | 250/236 |
| 5,035,476 | 7/1991 | Ellis et al. | 350/6.5 |

OTHER PUBLICATIONS

Japanese Journal of Applied Physics, M. Ogura et al., pp. L617–L619, "Scanning Optial Fiber ...".
Optics, E. Hecht et al., pp. 350–355, Addison–Wesley Publishing Co., 1974, Reading, Mass.

Primary Examiner—Frank Gonzalez
Attorney, Agent, or Firm—Ladas & Parry

[57] ABSTRACT

A diffraction limited confocal microscope (30) includes an energy source (31) to provide focussable illuminating energy and a single mode energy guide (34) comprising a core, an energy receiver (33) and an energy exit (35). The energy guide is operatively associated with the energy source so that illuminating energy from the energy source is received by the energy receiver and coupled into the core and guided to the energy exit so as to emerge from the core at the energy exit. A first focusser (39) is operatively associated with the energy exit to focus at least a portion of the illuminating energy emerging from the core into a diffraction limited spot pattern volume having a central portion which in use intersects an object (40). A second focusser (39) is operatively associated with the first focusser to collect outgoing energy from the volume resulting from interaction between the illuminating energy in the volume and the object and/or resulting from transmission or reflection of illuminating energy from the volume. The microscope includes a detector (45) having an aperture and a detecting element wherein the detector is operatively associated with the second focusser whereby the second focusser images the aperture onto the central portion wherein the numerical aperture, NA, of the outgoing energy originating from the central portion focussed onto the aperture, the wavelength of the outgoing energy, $\lambda$, and the average diameter, d, of the aperture are related by the equation: $NA \leq 0.6 \times \lambda/d$ whereby the detector detects the outgoing energy.

72 Claims, 6 Drawing Sheets

CONFOCAL MICROSCOPE

TECHNICAL FIELD

This invention relates to a diffraction limited confocal microscope, a diffraction limited reflection confocal microscope and a method of scanning an object.

BACKGROUND ART

A schematic drawing of a conventional reflection confocal microscope is shown in FIG. 1. Laser light from laser 1 is focussed onto mechanical pinhole 3 by microscope objective 2. The expression "mechanical pinhole" in this specification means a conventional pinhole in a sheet which is typically of metal. The expanding light beam from pinhole 3 is collimated by lens 4 before passing through polarizing beam splitter 8, which polarizes the beam, and quarter waveplate 7, which makes the beam circularly polarized. The beam is then focussed into a diffraction limited spot on object 6 by high quality microscope objective 5. Light reflected and scattered by object 6 is collected by objective 5 which collimates the beam. Light reflected by object 6 remains circularly polarized so that when it passes back through quarter waveplate 7 it is again linearly polarized, but in the direction perpendicular to the original polarized beam. The polarization of light scattered by object 6 being random, will be unaffected by quarter waveplate 7. The light reflected by object 6, with its polarization now rotated by 90 degrees, is redirected by polarizing beam splitter B. A portion of the light scattered by object 6 will also be redirected by polarizing beam splitter 8. The redirected light is focussed onto detector pinhole 10 by imaging element 9. A detector 11 measures the amount of light that passes through the pinhole 10. Object 6 is scanned mechanically in the x, y and z directions by stage 12.

The basis of operation of a reflection confocal microscope can be seen by examination of FIG. 2 which is a schematic drawing of a simplified confocal microscope arrangement. A mechanical pinhole point source of light 15 is imaged onto object 17 by a high quality optical element 16. The illuminating pinhole size 15 is chosen such that light striking object 17 forms a diffraction limited spot pattern whose size is determined by the wavelength of light and the characteristics of high quality optical element 16. The light reflected and scattered by the surface is collected by the high quality optical element 16 and redirected by beam splitter 13 onto a pinhole detector 14. For maximum resolution the size of the pinhole at detector 14 is chosen to be slightly smaller than the first minimum of the diffraction limited spot imaged onto it.

The confocal arrangement described above in FIG. 2 results in a resolution gain of approximately 0.4 over that of conventional microscopes. By using an annulus, this resolution gain is increased to approximately 0.7 over that of a conventional microscope. Additionally, the confocal microscope has a much reduced depth of field, when compared to that of conventional microscopes, which enables out-of-focus information to be removed from the image. This enables rough, curved or partially transparent surfaces to be properly imaged.

In order to obtain an image of an object, the object (or the microscope) is scanned in x, y and z directions with the maximum signal during a z scan being chosen as the intensity at the x, y position. For partially transparent objects, such as biological cells, three dimensional information can be extracted. There is no limit to the size of the area that can be imaged without compromising the resolution. It should be noted that the signal from a confocal microscope is readily amenable to electronic image enhancement.

Mechanical pinholes are susceptible to dirt lodging in the aperture. Even the smallest amount of dirt in a mechanical pinhole in a confocal microscope creates a problem as the resultant light field is no longer circularly symmetrical and aberrations are introduced. Further, slight misalignment of a mechanical pinhole or any other element in a conventional confocal microscope causes asymmetric intensity distribution of the light beam emerging from the mechanical pinhole again causing aberrations.

OBJECTS OF INVENTION

Each of these objects is accomplished by use of an optical fiber.

It is an object of this invention to provide a diffraction limited confocal microscope.

Another object is to provide a diffraction limited reflection confocal microscope.

A further object is to provide a method of scanning an object.

DISCLOSURE OF INVENTION

According to a first embodiment of this invention there is provided a diffraction limited confocal microscope comprising:

an energy source to provide focussable illuminating energy;

a single mode energy guide comprising a core, an energy receiver and an energy exit;

the energy guide being operatively associated with the energy source so that illuminating energy from the energy source is received by the energy receiver and coupled into the core and guided to the energy exit so as to emerge from the core at the energy exit;

a first focusser operatively associated with the energy exit to focus at least a portion of the illuminating energy emerging from the core into a diffraction limited spot pattern volume having a central portion which in use intersects an object;

a second focusser operatively associated with the first focusser, and in use with the object, to collect outgoing energy from the volume resulting from interaction between the illuminating energy in the volume and the object and/or resulting from transmission of illuminating energy through the volume;

a detector having an aperture and a detecting element;

wherein the detector is operatively associated with the second focusser whereby the second focusser images the aperture onto the central portion wherein the numerical aperture, NA, of the outgoing energy originating from the central portion focussed onto the aperture, the wavelength of the outgoing energy, $\lambda$, and the average diameter, d, of the aperture are related by the equation:

$$NA \lesssim 0.6 \times \lambda/d$$

whereby the detector detects the outgoing energy.

The aperture can be a pinhole aperture.

The aperture may be the core at an energy receiving end of a second energy guide having a core which also has an energy exit operatively associated with said detecting element to detect outgoing energy focussed into the core of the second energy guide.

The energy guide operatively associated with the detector may be a multimode energy guide or a single mode energy guide.

According to a second embodiment of this invention there is provided a diffraction limited confocal microscope comprising:

an energy source to provide focussable illuminating energy;

a single mode energy guide comprising a core, an energy receiver and an energy exit;

the energy guide being operatively associated with the energy source so that illuminating energy from the energy source is received by the energy receiver and coupled into the core and guided to the energy exit so as to emerge from the core at the energy exit;

a first focusser operatively associated with the energy exit to focus at least a portion of the illuminating energy emerging from the core into a diffraction limited spot pattern volume which in use intersects an object;

a second focusser operatively associated with the first focusser, and in use with the object, to collect outgoing energy from the volume resulting from interaction between the illuminating energy in the volume and the object and/or resulting from transmission of illuminating energy through the volume;

a detector having a detecting element, wherein the detector is operatively associated with the second focusser whereby the second focusser images the detecting element onto a central portion of the illuminating energy in the volume wherein the numerical aperture, NA, of the outgoing energy originating from the central portion focussed onto the detecting element, the wavelength of the outgoing energy, λ, and the average diameter, d, of the detecting element are related by the equation:

$$NA \lesssim 0.6 \times \lambda/d$$

whereby the detector detects the outgoing energy.

Typically the microscope of the first and second embodiments further include an energy splitter provided in the energy path between the core at the energy exit and the volume, to direct the outgoing energy to the detector and wherein the illuminating and outgoing energy paths are substantially the same between the volume and the splitter.

Generally the first focusser and the second focusser have common energy focussing elements.

The energy splitter may be a wavelength dependent splitter.

Generally the microscope of the second embodiment further includes a polarizer, operatively associated with the energy source, to polarize the illuminating energy and wherein said energy splitter is polarization dependent.

The microscope of the second embodiment may also include a polarization device disposed in the path of the polarized illuminating energy and the outgoing energy between the polarization dependent energy splitter and the volume, to at least partially circularly polarize the illuminating energy and to at least partially linearly polarize the outgoing energy passing back through the polarization dependent energy splitter.

According to a third embodiment of this invention there is provided a diffraction limited reflection confocal microscope comprising:

an energy source to provide focussable illuminating energy;

a single mode energy guide comprising a core, an energy receiver and an energy exit;

the energy guide being operatively associated with the energy source so that illuminating energy from the energy source is received by the energy receiver and coupled into the core and guided to the energy exit so as to emerge from the core at the energy exit;

a focusser operatively associated with the energy exit to focus at least a portion of the illuminating energy emerging from the core into a diffraction limited spot pattern volume having a central portion which in use intersects an object, to collect outgoing energy resulting from interaction between the illuminating energy in the volume and the object and to direct at least a portion of the outgoing energy into the core at the energy exit;

a detector; and an energy emanator operatively associated with the guide and the detector to extract the outgoing energy from the core and direct the outgoing energy to the detector;

wherein the focusser images the core at the energy exit onto the central portion wherein the numerical aperture, NA, of the outgoing energy originating from the central portion focussed onto the core at the energy exit, the wavelength of the outgoing energy, λ, and the average diameter, d, of the core at the energy exit are related by the equation:

$$NA \lesssim 0.6 \times \lambda/d$$

The following comments apply to the third embodiment.

The diffraction limited reflection confocal microscope of the third embodiment can include scanning means operatively associated with the energy guide adjacent the exit end to move the exit end in the x and/or y and/or z directions to scan the diffraction limited spot pattern volume in and about the object. The scanning means can be a piezoelectric stack, a magnetic core/magnetic coil combination, a mechanical vibrator, an electromechanical vibrator, a mechanical or electromechanical scanning mechanism such as a servomotor, an acoustic coupler or any other suitable means.

Generally, the receiver and the emanator have a energy splitter in common which enables a portion of the illuminating energy from the source to be directed into the core of the energy guide and enables a portion of the outgoing energy in the core of the energy guide to be directed to the detector. Typically, said energy splitter comprises a wavelength dependent energy splitter. The energy splitter may be an energy guide coupler such an a optical fibre coupler. The optical fibre coupler may be a fused biconical taper coupler, a polished block coupler, a bottled and etched coupler or a bulk optics type coupler with fibre entrance and exit pigtails, a planar waveguide device based on photolithographic or ion-diffusion fabrication techniques or other like coupler.

Also the reflection confocal microscope may further include a polarizer, operatively associated with the energy source, to polarize the illuminating energy and said energy splitter is polarization dependent. A polarization device disposed in the path of the polarized illuminating energy and the outgoing energy between the polarization dependent energy spitter and the volume, to at least partially circularly polarize the illuminating energy and to at least partially linearly polarize the outgoing energy passing back through the polarization dependent energy splitter can also be included.

In one particular arrangement a polarizer can be disposed between the illuminating energy source and a polarization dependent energy splitter, or the energy source may be inherently polarized, or the polarization dependent energy splitter polarizes the illuminating energy passing therethrough, whereby illuminating energy emanating from the splitter is linearly polarized illuminating energy. In this arrangement a polarization device such as a quarter wave device is disposed in the path of the polarized illuminating energy and the outgoing energy between the polarization dependent energy splitter and the object to circularly polarize the illuminating energy and to linearly polarize the outgoing energy passing back through the polarization dependent energy splitter in the direction perpendicular to the linearly polarized illuminating energy.

An energy scanner may be operatively associated with the energy exit and the focusser to move the image of the core at the energy exit relative to the focusser to scan the volume in and about the object. Typically the energy scanner is a movable energy reflector, an electro-energy device or an acousto-energy device.

A scanner may be operatively associated with the focusser to move the focusser with respect to the energy exit to scan the volume in and about the object.

In the first to third embodiments a scanner may be operatively associated with the energy exit and the focusser to move the combination of the energy exit and the focusser with respect to the object to scan the volume in and about the object In a further alternative a scanner is included which in use is operatively associated with the object to move the object in the x and/or y and/or z directions to scan the volume in and about the object The first to third embodiments may further include apparatus operatively associated with the detector, for storing and analysing a signal from the detector to provide information in respect of the object.

If the first to third embodiments have a scanner they may also include apparatus operatively associated with the detector and the scanner, for storing and analysing a signal from the detector and a signal from the scanner, which, in use, is indicative of the location of the entity being moved by the scanner, to provide information in respect of the object.

The storage and analysing apparatus is typically a computer. The computer can provide surface profile information and to obtain a high resolution in-focus image of a rough surface for example.

According to a fourth embodiment of this invention there is provided a method of scanning an object to provide information thereof comprising:

(a) focussing illuminating energy from the core at the energy exit of a single mode energy guide comprising a core, an energy receiver and an energy exit, into a diffraction limited spot pattern volume having a central portion which intersects the object;

(b) imaging the core onto the central portion of the volume and thereby collecting outgoing energy resulting from interaction between the illuminating energy in the volume and the object, wherein the numerical aperture, NA, of the outgoing energy originating from the central portion focussed onto the core, the wave length of the outgoing energy, $\lambda$, and the average diameter, d, of the core at the exit end are related by the equation:

$$NA \lesssim 0.6 \times \lambda/d$$

c) detecting the outgoing energy entering the core at the exit end to provide a signal indicative of the interaction;

d) refocussing illuminating energy from the core at the energy exit of a single mode energy guide to focus at least a portion of the central region in another volume intersected by the object;

e) repeating steps (b) and (c); and f) repeating steps (d) and (e).

Typically the method of the fourth embodiment further includes storing and analysing the detected signal to provide information in respect of the object Alternatively, the method of the fourth embodiment may include storing and analysing the detected signal and the position of the volume with respect to the object to provide information in respect of the object.

Generally, in the first to fourth embodiments the numerical aperture, NA. of the outgoing energy originating from the central portion focussed onto the aperture, the wavelength of the outgoing energy, $\lambda$, and the average diameter, d, of the aperture, detector element or core are related by the equation:

$$NA < 0.6 \times \lambda/d$$

The following comments apply to the first to fourth embodiments.

The energy guide can be flexible and can be an energy fibre.

The energy source can provide a solid particle beam, such as a neutron, proton or electron beam or a beam of alpha particles, acoustic waves, such as sound waves, or electromagnetic radiation, such as gamma rays, x-rays, UV light, visible light, infrared light or microwaves. Generally the energy source is a source of electromagnetic radiation with a wavelength in the range of and including far UV to far IR and the energy guide is an optical fibre.

Examples of light sources include incandescent sources, such as tungsten filament source, vapour lamps such as halogen lamps including sodium and iodine vapour lamps, discharge lamps such as xenon arc lamp and a Hg arc lamp, solid state light sources such as photo diodes, super radiant diodes, light emitting diodes, laser diodes, electroluminiscent light sources, laser light sources including rare gas lasers such as an argon laser, argon/krypton laser, neon laser, helium neon laser, xenon laser and krypton laser, carbon monoxide and carbon dioxide lasers, metal ion lasers such as cadmium, zinc, mercury or selenium ion lasers, lead salt lasers, metal vapour lasers such as copper and gold vapour lasers, nitrogen lasers, ruby lasers, iodine lasers, neodymium glass and neodymium YAG lasers, dye lasers such as a dye laser employing rhodamine 640, Kiton Red 620 or rhodamine 590 dye, and a doped fibre laser.

The energy guide can be a flexible, single mode optical fibre. For example, a five micron core fibre which is single mode at a wave length of 633 nanometers given an appropriate refractive index profile. A step index optical fibre becomes single mode when the numerical aperture, NA, the fibre core radius, a, and the wave length of light, λ, obey the relationship:

$$2 \times \pi \times NA \times a/\lambda \leq 2.405.$$

The focusser can be refractive glass lenses, including microscope objectives, reflective lenses, and/or holographic optical elements. If the energy is of a frequency other than in the range of UV to near infrared light or other types of energies, analogous focussing elements are used in place of the optical focussing elements.

A particular diffraction limited confocal microscope of the present invention utilizes a single mode optical fibre/light source in place of a mechanical pinhole/light source combination. As already pointed out mechanical pinholes are particularly susceptible to dirt lodging in the aperture. Even the smallest amount of dirt in the aperture of a mechanical pinhole creates a problem as a light beam emerging from such a pinhole is no longer circularly symmetrical and aberrations are introduced into the system. Whilst dirt can lodge on the light entry and exit ends of an optical fibre it is relatively easy to clean and if necessary, can be recleaved As already pointed out above, a mechanical pinhole/light source combination is difficult to align accurately. If a mechanical pinhole is not properly aligned, the resolution of the confocal microscope is severely affected and anomalous diffraction spot geometries result which have serious consequences in respect of the accuracies of depth studies and other studies. On the other hand, if a single mode optical fibre/light source combination is not properly aligned, whilst the light intensity of a light beam emerging from the exit end of the fibre decreases, the emerging light beam is still circularly symmetrical.

When an integral single mode optical fibre/light source combination is utilized in a reflection confocal microscope the problem of aligning the optical fibre with the light source which is a relatively difficult task is effectively eliminated. This latter combination also reduces the number of discrete optical components that require mounting in the confocal microscope. In addition, if an integral single mode optical fibre/laser diode combination is used, a laser diode with an integral feedback detector can be utilized which enables monitoring and control of the power output of the laser diode. Analogously utilization of an integral optical fibre/detector effectively eliminates the need for aligning the optical fibre with the detector.

A further advantage of a single mode optical fibre/light source and optical fibre/detector combination in a reflection confocal microscope is that the light source and detector and associated electronics can be remotely located from the optical hardware such as the polarizer and focussing lens or focussing lens system. Of particular advantage is the fact that the light source and detector when located remote from the object can be easily temperature controlled increasing lifetime, accuracy and reliability, which is particularly useful in harsh industrial environments.

BEST MODE AND OTHER MODES FOR CARRYING OUT THE INVENTION

Figure 1:
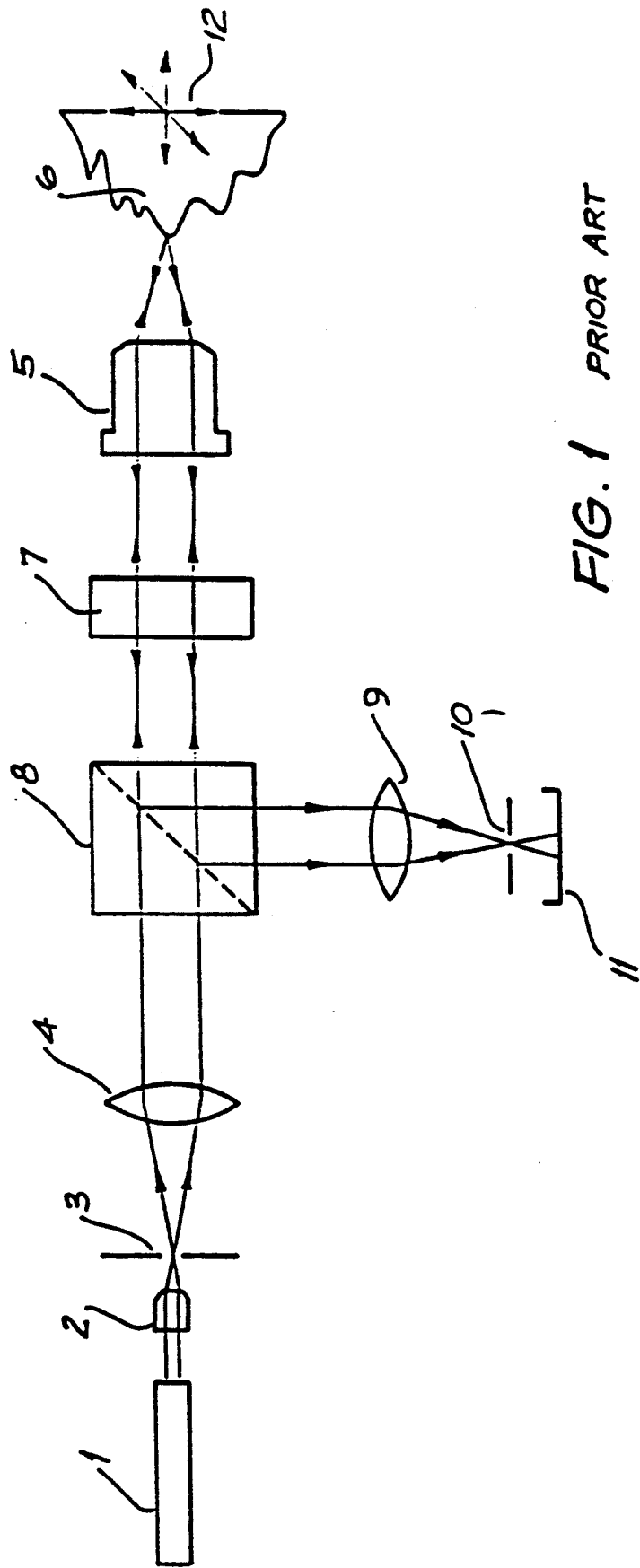
FIG. 1 a schematic drawing of a conventional diffraction limited confocal microscope.
Figure 2:
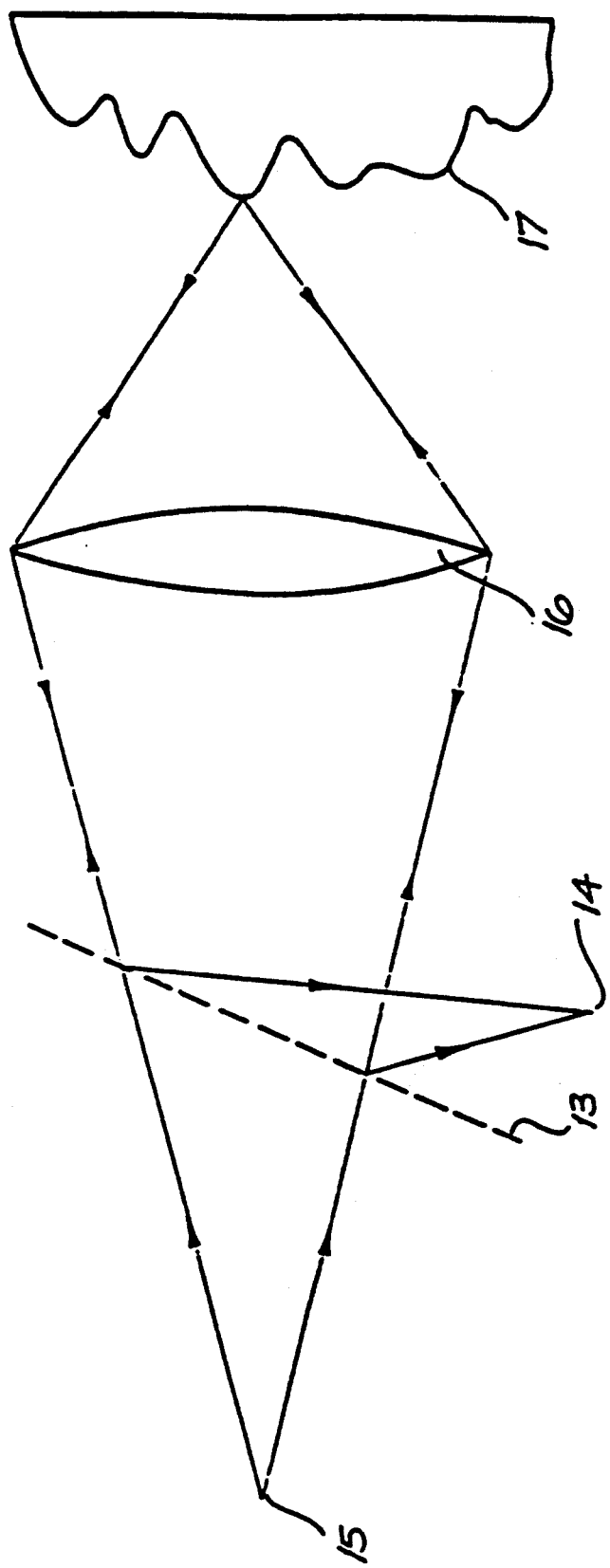
FIG. 2 is a schematic drawing of a simplified diffraction limited confocal microscope arrangement.
Figure 3:
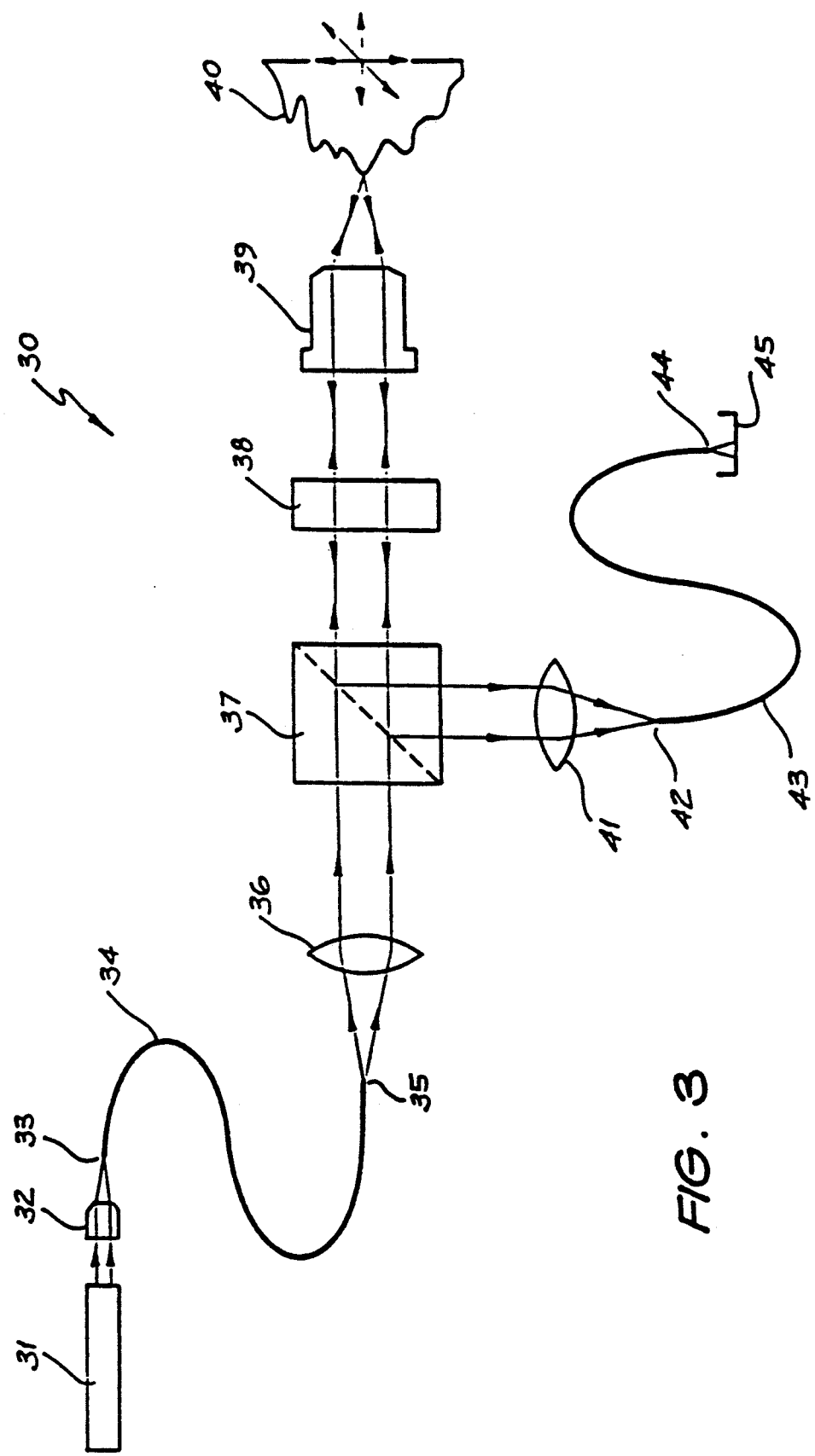
FIG. 3 is a schematic drawing of a diffraction limited confocal microscope according to the present invention.

Referring to FIG. 3 a diffraction limited reflection confocal microscope 30 has a laser 31 disposed on one side of focussing element 32. Laser light from laser 31 falls on element 32 and is focussed onto light receiving end 33 of single mode optical fibre 34. Fibre 34 has a light exit end 35. A collimating lens 36 is operatively disposed in relation to exit end 35 to collimate illuminating laser light emerging therefrom. Polarizing beam splitter 37 is operatively disposed in relation to collimating lens 36 to polarize collimated illuminating laser light therefrom. A quarter waveplate 38 is operatively disposed in relation to the polarizer to circularly polarize polarized illuminating laser light emerging from beam splitter 37. A high quality microscope objective 39 is operatively disposed in relation to waveplate 38 to focus circularly polarized illuminating laser light which has passed through waveplate 38 into a diffraction limited spot pattern volume intersecting object 40. Outgoing light resulting from interaction between illuminating laser light in the volume and object 40 is collected by objective 39 and collimated to form collimated outgoing light. The collimated outgoing light passes through quarter waveplate 38. Outgoing light from object 40 passes through quarter waveplate 38 A portion of this outgoing light is reflected by polarizing beam splitter 37 onto focussing lens 41. Focussing lens 41 is operatively disposed in relation to beam splitter 37 to focus outgoing light reflected by beam splitter 37 onto light receiving end 42 of second optical fibre 43. Focussing lens 41 and objective 39 are arranged to image the core of the light receiving end 42 of fibre 43 onto the central portion of the illuminating laser light diffraction limited spot pattern wherein the numerical aperture, NA, of the outgoing light originating from the central portion focussed onto the fibre core, the wavelength of the outgoing light, λ, and the average diameter, d, of the fibre core at light receiving end 42 of fibre 43 are related by the equation:

$$NA = 0.36 \times \lambda/d.$$

Photodetector 45 is disposed to detect outgoing light emerging from exit end 44 of second optical fibre 43.

In use illuminating laser light from laser 31 falls on focussing element 32 which focusses illuminating laser light onto light receiving end 33 of single mode optical fibre 34. The illuminating laser light collected by the core of light receiving end 33 of fibre 34 passes through fibre 34 and emerges from exit end 35. Exit end 35 effectively acts as a pinhole. Illuminating laser light emerging from exit end 35 passed through collimating lens 36 which collimates the illuminating laser light. The collimated illuminating laser light passed through beam splitter 37 and emerges as linearly polarized collimated illuminating laser light. The linearly polarized collimated illuminating laser light then passes through waveplate 38. Collimated illuminating laser light emerging from waveplate 38 is circularly polarized and passes through microscope objective 39 which focusses the illuminating laser light into a diffraction limited spot pattern volume intersecting object 40. Outgoing light resulting from interaction between the illuminating laser light in the volume and object 40 is collected by objective 39 and collimated. The collimated outgoing light passes through quarter waveplate 38. Outgoing light reflected by the object 40 having passed through quarter waveplate 38 is now linearly polarized perpendicular to the linearly polarized illuminating laser light. Therefore it is reflected by polarizing beam splitter 37 onto focussing lens 41. Outgoing light scattered by object 40 having a random polarization is substantially unaffected by waveplate 38. A portion of this outgoing light is reflected by polarizing beam splitter 37 onto focussing lens 41. Lens 41 focusses outgoing light reflected by beam splitter 37 onto light receiving end 42 of second optical fibre 43. The outgoing light collected by the core of the light receiving end 42 passes through second optical fibre 43 and is detected by photodetector 45 on emerging from exit end 44. Surface profile information in connection with object 40 is typically obtained by moving objects 40 back and forward. In some instances, it is preferable to move microscope objective 39 back and forward instead of moving object 40. The position when maximum light is detected at detector 45 typically corresponds to the position of the surface of object 40. Object 40 can then be moved to a different position in the x-y plane and the process repeated. Again in some instances it is preferable to move microscope objective 39 in the x-y plane. The entire surface of object 40 can be mapped by repeating the above procedure for different x-y positions of object 40. A super-resolving filter(s) may be placed virtually anywhere in the illuminating and/or detecting paths in order to improve x and/or y and/or z resolution.

Figure 4:
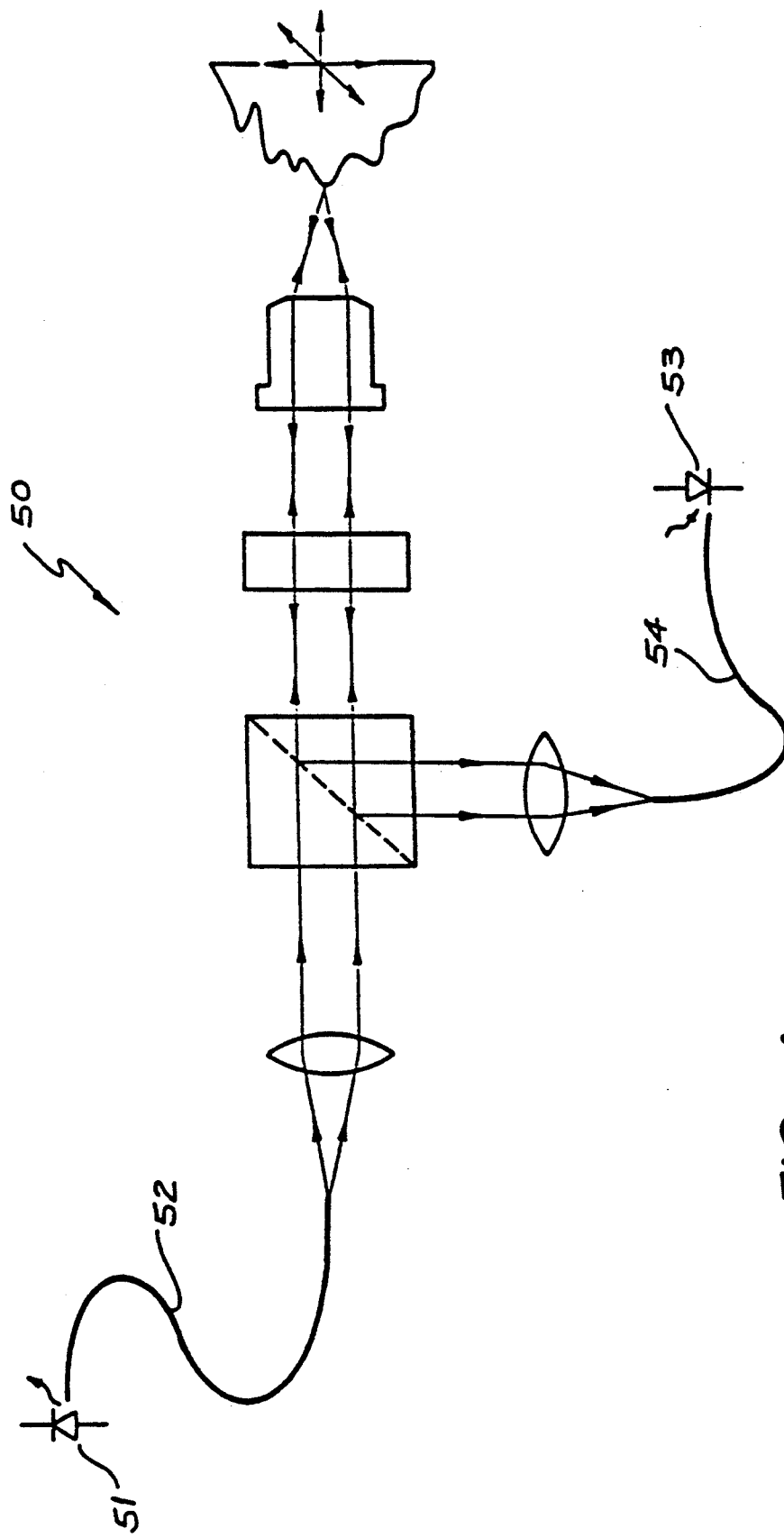
FIG. 4 is a schematic drawing of another diffraction limited confocal microscope according to the present invention.

The alternative diffraction limited reflection confocal microscope 50 illustrated in FIG. 4 is the same as confocal microscope 30 depicted in FIG. 3 except laser/focussing element/fibre entrance end 31, 32 and 33 are replaced by laser diode 51 having an integral single mode fibre optic pigtail 52 and fibre end/detector combination 44 and 45 are replaced by detector 53 and having an integral fibre optic pigtail 54.

The advantages of microscope 50 over microscope 30 depicted in FIG. 3 are that focussing element 32 is eliminated and there is no need to align laser 31 with light receiving end 33 of single mode fibre 34. Because integral fibre optic pigtail 52 is hermetically sealed in the same package as diode laser 51 dirt cannot enter the optical path between laser diode 51 and integral single mode optical fibre pigtail 52. In addition laser diode 51 typically has an integral feedback detector which thereby enables the power output of the laser to be determined. The advantages associated with the integral fibre optic pigtail 54 associated with photodetector 53 are that there is no need to locate the detector with respect to the fibre and dirt cannot enter the optical path as is the case where dirt can enter the optical path between exit end 44 and detector 45 in the embodiment depicted in FIG. 3.

Figure 5:
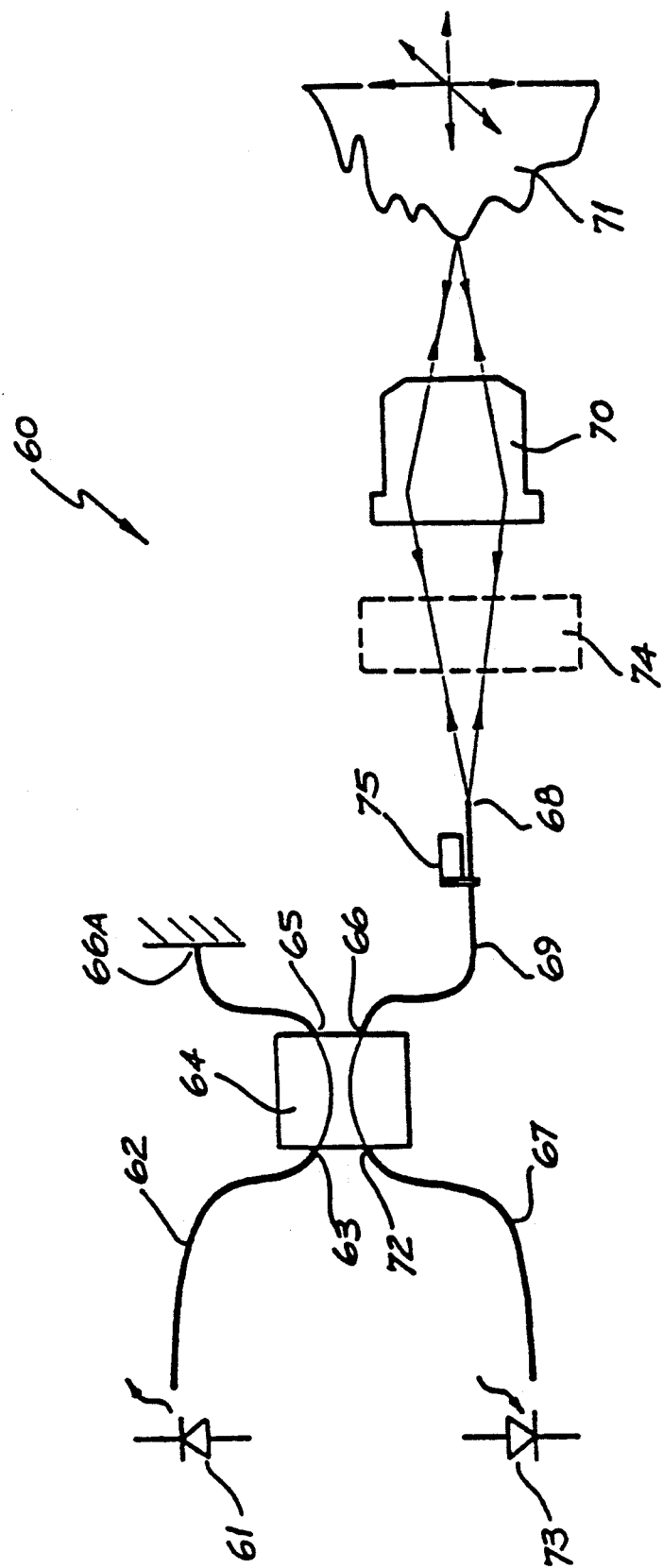
FIG. 5 is a schematic drawing of a further diffraction limited confocal microscope according to the present invention.

In a further alternative diffraction limited reflection confocal microscope 60 illustrated in FIG. 5 super radiant diode 61 with integral single mode optical fibre pigtail 62 is fused to port 63 of directional single mode fibre directional coupler 64. Illuminating light from integral fibre optic pigtail 62 is split between port 65 and 66. Port 65 of coupler 64 is terminated at end 66A to prevent back reflections. Alternatively fibre end 66A could be coupled to a detector to monitor the light power of super radiant diode 61. Illuminating light emerging from singe mode fibre exit end 68 of fibre 69 is collected by microscope objective 70 which has a finite tube length, and which is operatively disposed in relation to exit end 68 and object 71 to form a diffraction limited spot pattern volume intersecting object 71. Outgoing light resulting from interaction between illuminating light in the volume and object 71 is collected by objective 70 and focussed back onto fibre end 68. Microscope objective 70 images the core of the fibre end 68 onto the central portion of the illuminating light diffraction limited spot pattern wherein the numerical aperture, NA, of the outgoing light originating from the central portion focussed onto the fibre core, the wavelength of the outgoing light, λ, and the average diameter, d, of the fibre core at light exit end 68 of fibre 69 are related by the equation:

$$NA = 0.3 \times \lambda/d.$$

Outgoing light collected by the core of fibre 69 is split between ports 63 and 72 of single mode fibre directional coupler 64. Outgoing light from port 72 passes through integral fibre optic pigtail 67 to detector 73. Piezoelectric stack 75 is coupled to fibre 69 adjacent to fibre end 68.

In use illuminating light from super radiant diode 61 passes through integral single mode optical fibre pigtail 62 to port 63 of coupler 64. Coupler 64 splits the illuminating light between ports 65 and 66. Illuminating light passes from port 66 through fibre 69 and emerges from single mode fibre exit end 68 and is collected by microscope objective 70 which focusses the illuminating light into a diffraction limited spot pattern volume intersecting object 71. Outgoing light results from interaction between the illuminating light in the volume and the object and is collected by objective 70 and is focussed onto single mode fibre exit end 68. Light collected by the core at fibre exit end 68 passes through fibre 69 to port 66 of coupler 64. This outgoing light is split between ports 63 and 72 of coupler 64. Light from port 72 passes through integral optical fibre pigtail 67 and is detected by photodiode 73.

Microscope 60 can be utilized to obtain surface profile information in connection with object 71 or information within the volume of object 71, by moving fibre end 68 back and forward along the axis of the illuminating system (z direction}using piezoelectric stack 75. The position when maximum light is detected at detector 73 typically corresponds to the surface of object 71. It is also possible to scan object 71 in the x-y plane by moving fibre end 68 in the x-y plane. As for microscopes 30 and 50, in microscope 60 object 71 can also be profiled by moving the objective 70 and/or the object 71 in the x-y and z directions. In this manner the entire surface of object 71 can be mapped.

The advantages of microscope 60 over microscopes 50 and 30 are:

1. Because of the small mass of fibre 69 the object can be scanned very rapidly.

2. Fewer optical elements are required in microscope 60 as compared with microscopes 30 and 50. Apart from economic savings in respect of fewer optical elements since the only two elements that have to be optically located with respect to each other are fibre end 68 and objective 70 simpler mounting structures are required.

3. It is very simple to align microscope 60 as compared to microscopes 30 and 50. This is a consequence of fibre end 68 serving as both the fibre source and the fibre detector. Further, it is very difficult to misalign exit end 68.

If directional coupler 64 is a polarization splitting coupler and super radiant diode 61 is disposed such that illuminating polarized light entering port 63 is predominantly directed to port 66, a higher illuminating intensity occurs at object 71. Furthermore, if a quarter waveplate 74 is placed between fibre exit end 68 and objective 70, outgoing light entering fibre exit end 68 predominantly emerges from port 72 and onto photodiode 73. This is because a laser diode typically emits polarized light. By orienting super radiant diode 61/integral fibre optic pigtail 62 correctly with respect to polarization beam splitting coupler 64 the illuminating light passes predominantly out of coupler port 66, through fibre 69 and emerges polarized from fibre end 68. The linearly polarized illuminating light is circularly polarized after passing through quarter waveplate 74. Illuminating light reflected by object 71, when it passes back through quarter waveplate 74, becomes linearly polarized perpendicular to that of the illuminating light. Therefore this outgoing light, which passes through fibre 69 into port 66 of the polarizing beam splitting coupler 64 passes predominantly out through port 72 along fibre 67 and is detected by photodiode 73.

The advantage of including quarter waveplate 74 and using a polarizing beam splitting coupler 64 is that the signal resulting from an object 71 which reflects a portion of the illuminating light is increased.

Figure 6:
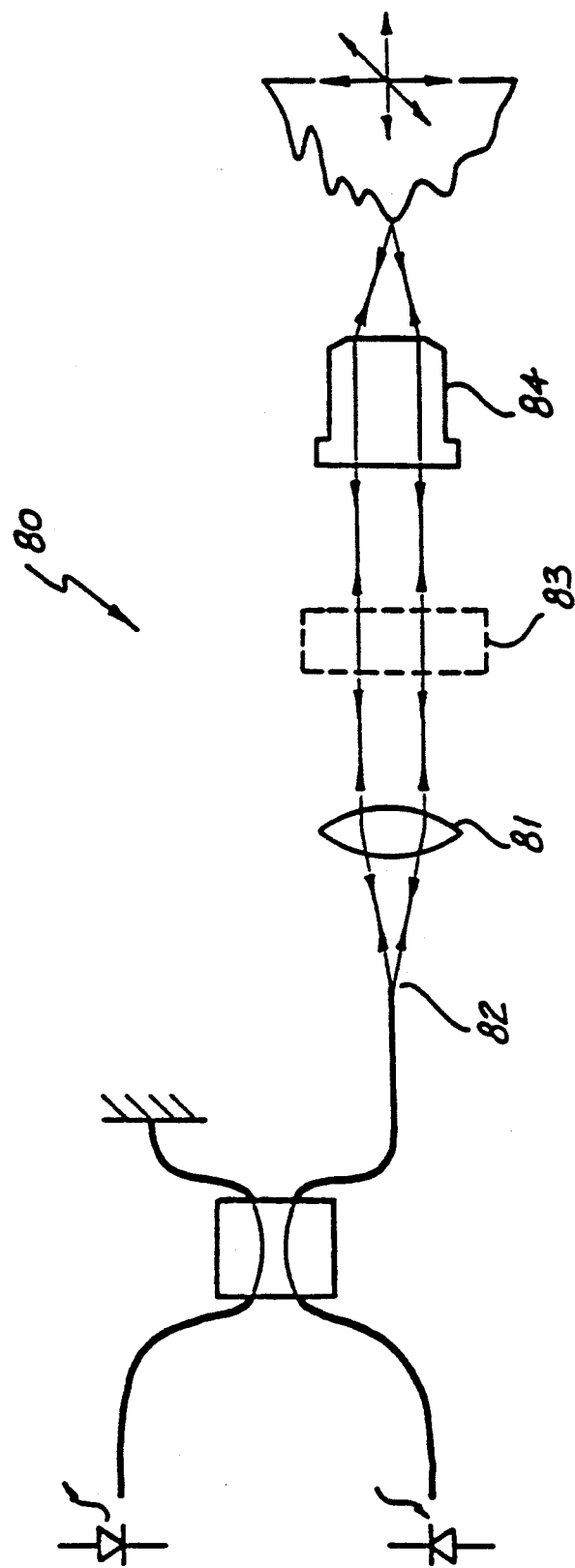
FIG. 6 is another schematic drawing of a diffraction limited reflection confocal microscope arrangement.

The alternative diffraction limited reflection confocal microscope 80 depicted in FIG. 6 is the same as confocal microscope 60 shown in FIG. 5 except optical element 81 is placed between fibre exit end 82 and quarter waveplate 83. Further, microscope objective 84 is an infinity corrected microscope objective. The advantage of microscope 80 over microscope 60 is that it is difficult to maintain diffraction limited operation in microscope objective 70 with quarter waveplate 74 present. In microscope 80 of FIG. 6 the inclusion of optical element 81 avoids the introduction of aberrations into the illuminating light and the outgoing light by waveplate 83.

INDUSTRIAL APPLICABILITY

A diffraction limited confocal microscope of the invention can be used in environments where vibration is a problem for conventional confocal microscopes since it can be aligned more easily and there are fewer parts to maintain in alignment. In addition, the illumination and detection optics and electronics of a confocal microscope of the invention can be placed at a distance from the actual optical focussing train of the microscope thus enabling it to be operated in electrically noisy environments without the need for complex electrical shielding. In a particular embodiment of a confocal microscope of the invention, because of the use of the novel arrangement of the single optical fibre source/detector aperture, it is not susceptible to minor misalignment resulting in asymmetric pinhole placement and therefore, unlike a conventional confocal microscope, continuous monitoring of the pinhole position is not necessary.

Since an energy guide, and when light is used as the energy source, an optical fibre, is used as the illuminating light guide in a confocal microscope of this invention, such a microscope is more easily maintained and more reliable since energy guides and in particular, optical fibres are less susceptible to dirt contamination than the mechanical pinholes which are utilized in a conventional confocal microscope. Further, since there are fewer parts required in a confocal microscope of the invention it is inherently cheaper to manufacture and maintain. Moreover, in the case where a single optical fibre source/detector aperture is utilized in a confocal microscope of the invention it is possible to rapidly scan an object by simply vibrating the exit end of the fibre. This permits a confocal microscope of the invention to be utilized for more rapid imaging than conventional confocal microscopes while maintaining high resolution, diffraction limited operation.

I claim:

1. A diffraction limited confocal microscope comprising:

a light source to provide focussable illuminating energy;

a single mode energy guide comprising a core, an energy receiver and an energy exit:

the energy guide being operatively associated with the light source so that illuminating energy from the light source is received by the energy receiver and coupled into the core and guided to the energy exit so as to emerge from the core at the energy exit;

a first focusser operatively associated with the energy exit to focus at least a portion of the illuminating energy emerging from the core into a diffraction limited spot pattern volume having a central portion which in use intersects an object;

a second focusser operatively associated with the first focusser, and in use with the object, to collect outgoing energy from the volume resulting from interaction between the illuminating energy in the volume and the object and/or resulting from transmission of illuminating energy through the volume;

a detector having an aperture and a detecting element;

wherein the detector is operatively associated with the second focusser whereby the second focusser images the aperture onto the central portion wherein the numerical aperture, NA, of the outgoing energy originating from the central portion focussed onto the aperture, the wavelength of the outgoing energy, $\lambda$, and the average diameter, d, of the aperture are related by the equation:

$$NA \lesssim 0.6 \times \lambda/d$$

whereby the detector detects the outgoing energy.

2. A diffraction limited confocal microscope according to claim 1 wherein said numerical aperture, NA, of the outgoing energy originating from the central portion focussed onto the aperture, the wavelength of the outgoing energy, $\lambda$, and the average diameter, d, of the aperture are related by the equation:

$$NA < 0.6 \times \lambda/d.$$

3. A diffraction limited confocal microscope according to claim 1 wherein said aperture is a pinhole aperture 4. A diffraction limited confocal microscope according to claim 1 wherein said aperture is the core at an energy receiving end of a second energy guide having a core which also has an energy exit operatively associated with said detecting element to detect outgoing energy focussed into the core of the second energy guide.

5. A diffraction limited confocal microscope according to claim 4 wherein said second energy guide is a single mode energy guide.

6. A diffraction limited confocal microscope comprising:

light source to provide focussable illuminating energy;

a single mode energy guide comprising a core, an energy receiver and an energy exit;

the energy guide being operatively associated with the light source so that illuminating energy from the light source is received by the energy receiver and coupled into the core and guided to the energy exit so as to emerge from the core at the energy exit;

a first focusser operatively associated with the energy exit to focus at least a portion of the illuminating energy emerging from the core into a diffraction limited spot pattern volume which in use intersects an object;

a second focusser operatively associated with the first focusser, and in use with the object, to collect outgoing energy from the volume resulting from interaction between the illuminating energy in the volume and the object and/or resulting from transmission of illuminating energy through the volume;

a detector having a detecting element;

wherein the detector is operatively associated with the second focusser whereby the second focusser images the detecting element onto a central portion of the illuminating energy in the volume wherein the numerical aperture, NA, of the outgoing energy originating from the central portion focussed onto the detecting element, the wavelength of the outgoing energy, $\lambda$, and the average diameter, d, of the detecting element are related by the equation:

$$NA \lesssim 0.6 \times \lambda/d$$

whereby the detector detects the outgoing energy.

7. A diffraction limited confocal microscope according to claim 6 wherein said numerical aperture, NA, of the outgoing energy originating from the central portion focussed onto the element, the wavelength of the outgoing energy, $\lambda$, and the average diameter, d, of the element are related by the equation:

$$NA < 0.6 \times \lambda/d.$$

8. A diffraction limited confocal microscope according to claim 1 further comprising an energy splitter provided in the energy path between the core at the energy exit and the volume, to direct the outgoing energy to the detector and wherein the illuminating and outgoing energy paths are substantially the same between the volume and the splitter.

9. A diffraction limited confocal microscope according to claim 8 wherein the first focusser and the second focusser have common energy focussing elements.

10. A diffraction limited confocal microscope according to claim 8 wherein said energy splitter comprises a wavelength dependent splitter.

11. A diffraction limited confocal microscope according to claim 8 further comprises a polarizer, operatively associated with the energy source, to polarize the illuminating energy and wherein said energy splitter is polarization dependent.

12. A diffraction limited confocal microscope according to claim 11 further comprising a polarization device disposed in the path of the polarized illuminating energy and the outgoing energy between the polarization dependent energy splitter and the volume, to at least partially circularly polarize the illuminating energy and to at least partially linearly polarize the outgoing energy passing back through the polarization dependent energy splitter.

13. A diffraction limited reflection confocal microscope comprising:

a light source to provide focussable illuminating energy;

a single mode energy guide comprising a core, an energy receiver and an energy exit;

the energy guide being operatively associated with the light source so that illuminating energy from the light source is received by the energy receiver and coupled into the core and guided to the energy exit so as to emerge from the core at the energy exit;

a focusser operatively associated with the energy exit to focus at least a portion of the illuminating energy emerging from the core into a diffraction limited spot pattern volume having a central portion which in use intersects an object, to collect outgoing energy resulting from interaction between the illuminating energy in the volume and the object and to direct at least a portion of the outgoing energy into the core at the energy exit;

a detector; and an energy emanator operatively associated with the guide and the detector to extract the outgoing energy from the core and direct the outgoing energy to the detector;

wherein the focusser images the core at the energy exit onto the central portion wherein the numerical aperture, NA, of the outgoing energy originating from the central portion focussed onto the core at the energy exit, the wavelength of the outgoing energy, $\lambda$, and the average diameter, d, of the core at the energy exit are related by the equation:

$$NA \lesssim 0.6 \times \lambda/d.$$

14. A diffraction limited reflection confocal microscope according to claim 13 wherein said numerical aperture, NA, of the outgoing energy originating from the central portion focussed onto the core at the exit end, the wavelength of the outgoing energy, $\lambda$, and the average diameter, d, of the core at the exit end, are related by the equation:

$$NA < 0.6 \times \lambda/d.$$

15. A diffraction limited reflection confocal microscope according to claim 13 further comprising a scanner operatively associated with the energy guide to move the energy exit in the x and/or y and/or z directions to scan the diffraction limited spot pattern volume in and about the object.

16. A diffraction limited reflection confocal microscope according to claim 15 wherein said scanner is a piezoelectric stack, a magnetic core/magnetic coil combination, a mechanical vibrator, an electromechanical vibrator, a mechanical or electromechanical positioning mechanism or an acoustic coupler.

17. A diffraction limited reflection confocal microscope according to claim 13 wherein the receiver and the emanator have a energy splitter in common which enables a portion of the illuminating energy from the source to be directed into the core of the energy guide and enables a portion of the outgoing energy in the core of the energy guide to be directed to the detector.

18. A diffraction limited reflection confocal microscope according to claim 17 wherein said energy splitter comprises a wavelength dependent energy splitter.

19. A diffraction limited reflection confocal microscope according to claim 17 further comprising a polarizer, operatively associated with the energy source, to polarize the illuminating energy and wherein said energy splitter is polarization dependent.

20. A diffraction limited reflection confocal microscope according to claim 19, further comprising a polarization device disposed in the path of the polarized illuminating energy and the outgoing energy between the polarization dependent energy splitter and the volume, to at least partially circularly polarize the illuminating energy and to at least partially linearly polarize the outgoing energy passing back through the polarization dependent energy splitter.

21. A diffraction limited reflection confocal microscope according to claim 17 wherein said energy splitter comprises an energy guide coupler.

22. A diffraction limited reflection confocal microscope according to claim 21 wherein said energy guide coupler is a fused biconical taper coupler, a polished block coupler, a bottled and etched coupler, a bulk optics type coupler with fibre entrance and exit pigtails or a planar waveguide device based on photolithographic or ion-diffusion fabrication techniques.

23. A diffraction limited reflection confocal microscope according to claim 13 comprising an energy scanner operatively associated with the energy exit and the focusser to move the image of the core at the energy exit relative to the focusser to scan the volume in and about the object.

24. A diffraction limited reflection confocal microscope according to claim 23 wherein the energy scanner is a movable energy reflector, an electro-energy device or an acousto-energy device.

25. A diffraction limited reflection confocal microscope according to claim 13 further comprising a scanner operatively associated with the focusser to move the focusser with respect to the energy exit to scan the volume in and about the object.

26. A diffraction limited reflection confocal microscope according to claim 13 further comprising a scanner operatively associated with the energy exit and the focusser to move the combination of the energy exit and the focusser with respect to the object to scan the volume in and about the object.

27. A microscope according to claim 1 further comprising a scanner which in use is operatively associated with the object to move the object in the x and/or y and/or z directions to scan the volume in and about the object.

28. A microscope according to claim 1 further comprising apparatus operatively associated with the detector, for storing and analysing a signal from the detector to provide information in respect of the object.

29. A microscope according to claim 15, further comprising apparatus operatively associated with the detector and the scanner, for storing and analysing a signal from the detector and a signal from the scanner, which, in use, is indicative of the location of the entity being moved by the scanner, to provide information in respect of the object.

30. A microscope according to claim 27 further comprising apparatus operatively associated with the detector and the scanner, for storing and analysing a signal from the detector and a signal from the scanner, which, in use, is indicative of the location of the entity being moved by the scanner, to provide information in respect of the object.

31. A microscope according to claim 1, wherein said energy source comprises a source of electromagnetic radiation with a wavelength in the range of and including far UV to far IR and wherein said energy guide is an optical fibre.

32. A method of scanning an object to provide information thereof comprising:
(a) focussing light from the core at the energy exit of a single mode energy guide comprising a core, an energy receiver and an energy exit, into a diffraction limited spot pattern volume having a central portion which intersects the object;
(b) imaging the core onto the central portion of the volume and thereby collecting outgoing energy resulting from interaction between the light in the volume and the object, wherein the numerical aperture, NA, of the outgoing energy originating from the central portion focussed onto the core, the wave length of the outgoing energy, λ, and the average diameter, d, of the core at the exit end are related by the equation:

$$NA \lesssim 0.6 \times \lambda/d$$

c) detecting the outgoing energy entering the core at the exit end to provide a signal indicative of the interaction;
d) refocussing light from the core at the energy exit of a single mode energy guide to focus at least a portion of the central region in another volume intersected by the object;
e) repeating steps (b) and (c); and
f) repeating steps (d) and (e).

33. A method of scanning an object according to claim 32 wherein said numerical aperture, NA, of the outgoing energy originating from the central portion focussed onto the core at the exit end, the wavelength of the outgoing energy, λ, and the average diameter, d, of the core at the exit end, are related by the equation:

$$NA < 0.6 \times \lambda/d.$$

34. A method of scanning an object according to claim 32 further comprising storing and analysing the detected signal to provide information in respect of the object.

35. A method of scanning an object according to claim 32 further comprising storing and analysing the detected signal and the position of the volume with respect to the object to provide information in respect of the object.

36. A method of scanning an object according to claim 32 wherein said energy guide is an optical fibre and the illuminating and outgoing energy is electromagnetic radiation with a wavelength in the range of and including far UV to far IR.

37. A diffraction limited confocal microscope comprising:
- a light source to provide focussable illuminating energy;
- a single mode energy guide comprising a core, an energy receiver and an energy exit;
- the energy guide being operatively associated with the light source so that illuminating energy from the light source is received by the energy receiver and coupled into the core and guided to the energy exit so as to emerge from the core at the energy exit;
- a first focusser operatively associated with the energy exit to focus at least a portion of the illuminating energy emerging from the core into diffraction limited spot pattern volume having a central portion which is use intersects an object;
- a second focusser operatively associated with the first focusser, and in use with the object, to collect outgoing energy from the volume resulting from interaction between the illuminating energy in the volume and the object and/or resulting from transmission of illuminating energy through the volume;
- a detector having an aperture and a detecting element;
- wherein the detector is operatively associated with the second focusser whereby the second focusser images the central portion onto the aperture, whereby the detector detects the outgoing energy.

38. A diffraction limited confocal microscope according to claim 37 wherein the numerical aperture, NA, of the outgoing energy originating from the central portion imaged onto the aperture, the wavelength of the outgoing energy, λ, and the average diameter, d, of the aperture are related by the equation:

$$NA < 0.6 \times \lambda/d.$$

39. A diffraction limited confocal microscope according to claim 37 wherein said aperture is a pinhole aperture.

40. A diffraction limited confocal microscope according to claim 37 wherein said aperture is the core at an energy receiving end of a second energy guide having a core which also has an energy exit operatively associated with said detecting element to detect outgoing energy focussed into the core of the second energy guide.

41. A diffraction limited confocal microscope according to claim 40 wherein said second energy guide is a single mode energy guide.

42. A diffraction limited confocal microscope according to claim 37 further comprising an energy splitter provided in the energy path between the core at the energy exit and the volume to direct the outgoing energy to the detector, and wherein the illuminating and outgoing energy paths are substantially the same between the volume and the splitter.

43. A diffraction limited confocal microscope according to claim 42 wherein the first focusser and the second focusser have common energy focussing elements.

44. A diffraction limited confocal microscope according to claim 42 wherein said energy splitter comprises a wavelength dependent splitter.

45. A diffraction limited confocal microscope according to claim 42 further comprising a polarizer, operatively associated with the energy source, to polarize the illuminating energy and wherein said energy splitter is polarization dependent.

46. A diffraction limited confocal microscope according to claim 45 further comprising a polarization device disposed in the path of the polarized illuminating energy and the outgoing energy between the polarization dependent energy splitter and the volume to at least partially circularly polarize the illumination energy and to at least partially linearly polarize the outgoing energy passing back through the polarization dependent energy splitter.

47. A microscope according to claim 37 further comprising a scanner which in use is operatively associated with the object to move the object in the x and/or y and/or z directions to scan the volume in and about the object.

48. A microscope according to claim 47 further comprising apparatus operatively associated with the detector and scanner for storing and analyzing a signal form the detector and a signal from the scanner which, in use, is indicative of the location of the entity being moved by the scanner to provide information in respect of the object.

49. A microscope according to claim 37 further comprising apparatus operatively associated with the detector for storing and analyzing a signal from the detector to provide information in respect of the object.

50. A microscope according to claim 37 wherein said energy source comprises a source of electromagnetic radiation with a wavelength in the range of an including far UV to far IR and wherein said energy guide is an optical fibre.

51. A diffraction limited confocal microscope comprising:
- a light source to provide focussable illuminating energy;
- a single mode energy guide comprising a core, an energy receiver and an energy exit;
- the energy guide being operatively associated with the light source so that illuminating energy from the light source is received by the energy receiver and coupled into the core and guided to the energy exit so as to emerge from the core at the energy exit;
- a first focusser operatively associated with the energy exit to focus at least a portion of the illuminating energy emerging from the core into a diffraction limited spot pattern volume which in use intersects an object;
- a second focusser operatively associated with the first focusser, and in use with the object, to collect outgoing energy from the volume resulting from interaction between the illuminating energy in the volume and the object and/or resulting from transmission of illuminating energy through the volume;
- a detector having a detecting element;
- wherein the detector is operatively associated with the second focusser whereby the second focusser images a central portion of the illuminating energy in the volume onto the detecting element, whereby the detector detects the outgoing energy.

52. A diffraction limited confocal microscope according to claim 51 wherein the numerical aperture, NA, of the outgoing energy originating from the central portion imaged onto the element, the wavelength of the outgoing energy, λ, and the average diameter, d, of the element are related by the equation:

$$NA < 0.6 \times \lambda/d.$$

53. A diffraction limited reflection confocal microscope comprising:
   a light source to provide focussable illuminating energy;
   a single mode energy guide comprising a core, an energy receiver and an energy exit;
   the energy guide being operatively associated with the light source so that illuminating energy from the light source is received by the energy receiver and coupled into the core and guided to the energy exit so as to emerge from the core at the energy exit;
   a focuser operatively associated with the energy exit to focus at least a portion of the illuminating energy emerging from the core into a diffraction limited spot pattern volume having a central portion which, in use, intersects an object to collect outgoing energy resulting from interaction between the illuminating energy in the volume and the object and to direct at least a portion of the outgoing energy into the core at the energy exit;
   a detector; and
   an energy emanator operatively associated with the guide and the detector to extract the outgoing energy from the core and direct the outgoing energy to the detector;
   wherein the focusser images the central portion onto the core at the exit end.

54. A diffraction limited reflection confocal microscope according to claim 53 wherein the numerical aperture, NA, of the outgoing energy originating from the central portion imaged onto the core at the exit end, the wavelength of the outgoing energy, λ, and the average diameter, d, of the core at the exit end, are related by the equation:

$$NA < 0.6 \times \lambda/d.$$

55. A diffraction limited reflection confocal microscope according to claim 53 further comprising a scanner operatively associated with the energy guide to move the energy exit in the x and/or y z directions to scan the diffraction limited spot pattern volume in and about the object.

56. A diffraction limited reflection confocal microscope according to claim 55 wherein said scanner is a piezoelectric stack, a magnetic core/magnetic coil combination, a mechanical vibrator, an electromechanical vibrator, a mechanical or electromechanical positioning mechanism or an acoustic coupler.

57. A microscope according to claim 55 further comprising apparatus operatively associated with the detector and the scanner for storing and analyzing a signal from the detector and a signal from the scanner which, in use, is indicative of the location of the entity being moved by the scanner to provide information in respect of the object.

58. A diffraction limited reflection confocal microscope according to claim 53 wherein the receiver and the emanator have an energy splitter in common which enables a portion of the illuminating energy from the source to be directed into the core of the energy guide and enables a portion of the outgoing energy in the core of the energy guide to be directed to the detector.

59. A diffraction limited reflection confocal microscope according to claim 58 wherein said energy splitter comprises a wavelength dependent energy splitter.

60. A diffraction limited reflection confocal microscope according to claim 58 further comprising a polarizer, operatively associated with the energy source, to polarize the illuminating energy and wherein said energy splitter is polarization dependent.

61. A diffraction limited reflection confocal microscope according to claim 60, further comprising a polarization device disposed in the path of the polarized illuminating energy and the outgoing energy between the polarization dependent energy splitter and the volume to at least partially circularly polarize the illuminating energy and to at least partially linearly polarize the outgoing energy passing back through the polarization dependent energy splitter.

62. A diffraction limited reflection confocal microscope according to claim 58 wherein said energy splitter comprises an energy guide coupler.

63. A diffraction limited reflection confocal microscope according to claim 62 wherein said energy guide coupler is a fused biconical taper coupler, a polished block coupler, a bottled and etched coupler, a bulk optics type coupler with fibre entrance and exit pigtails or a planar waveguide device based on photolithographic or ion-diffusion fabrication techniques.

64. A diffraction limited reflection confocal microscope according to claim 53 comprising an energy scanner operatively associated with the energy exit and the focusser to move the image of the core at the energy exit relative to the focusser to scan the volume in and about the object.

65. A diffraction limited reflection confocal microscope according to claim 64 wherein the energy scanner is a movable energy reflector, an electro-energy device or an acousto-energy device.

66. A diffraction limited reflection confocal microscope according to claim 53 further comprising a scanner operatively associated with the focusser to move the focusser with respect to the energy exit to scan the volume in and about the object.

67. A diffraction limited reflection confocal microscope according to claim 53 further comprising a scanner operatively associated with the energy exit and the focusser to move the combination of the energy exit and the focusser with respect to the object to scan the volume in and about the object.

68. A method of scanning an object to provide information thereof comprising:
   (a) focussing light from the core at the energy exit of a single mode energy guide comprising a core, an energy receiver and an energy exit, into a diffraction limited spot pattern volume having a central portion which intersects the object;
   (b) imaging the central portion of the volume onto the core at the energy exit thereby collecting outgoing energy resulting from interaction between the light in the volume and the object;
   (c) detecting the outgoing energy entering the core at the exit end to provide a signal indicative of the interaction;

(d) refocussing light from the core at the energy exit of the single mode energy guide to focus at least a portion of the central region in another volume intersected by the object;

(e) repeating steps (b) and (c); and (f) repeating steps (d) and (e).

69. A method of scanning an object according to claim 68 wherein the numerical aperture, NA, of the outgoing energy originating from the central portion imaged onto the core at the exit end, the wavelength of the outgoing energy, $\lambda$, and the average diameter, d, of the core at the exit end, are related by the equation:

$$NA < 0.6 \times \lambda/d.$$

70. A method of scanning an object according to claim 68 further comprising storing and analyzing the detected signal to provide information in respect of the object.

71. A method of scanning an object according to claim 68 further comprising storing and analyzing the detected signal and the position of the volume with respect to the object to provide information in respect of the object.

72. A method of scanning an object according to claim 68 wherein said energy guide is an optical fibre and the illuminating and outgoing energy is electromagnetic radiation with a wavelength in the range of and including far UV to far IR.

* * * * *

UNITED STATES PATENT AND TRADEMARK OFFICE
CERTIFICATE OF CORRECTION

PATENT NO. : 5,161,053
DATED : November 3, 1992
INVENTOR(S) : Timothy P. DABBS

It is certified that error appears in the above-identified patent and that said Letters Patent is hereby corrected as shown below:

On title page, left column, item [73], after "Research"

insert -- Organisation --.

Signed and Sealed this

Twenty-sixth Day of October, 1993

Attest:

BRUCE LEHMAN

*Attesting Officer*   Commissioner of Patents and Trademarks